April 20, 1926.  1,581,787
Z. CIFFRINOWITSCH
REVERSIBLE INTEGRATING INSTRUMENT
Filed July 27, 1923
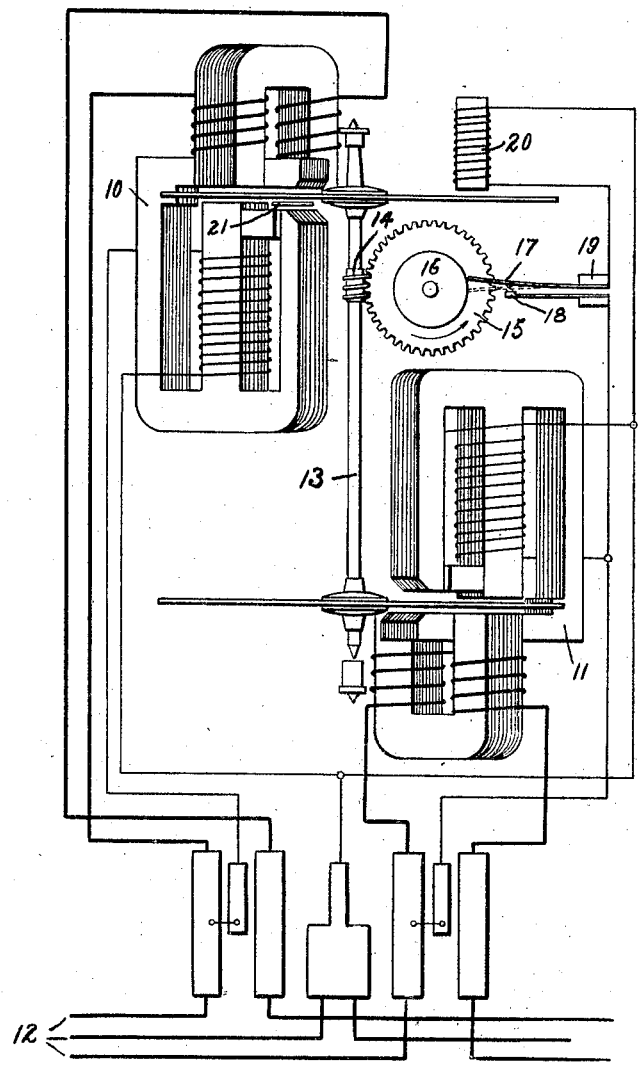
Inventor:
Zalmann Ciffrinowitsch,
by
His Attorney.

Patented Apr. 20, 1926.

1,581,787

UNITED STATES PATENT OFFICE.

ZALMANN CIFFRINOWITSCH, OF BERLIN, GERMANY, ASSIGNOR TO GENERAL ELECTRIC COMPANY, A CORPORATION OF NEW YORK.

REVERSIBLE INTEGRATING INSTRUMENT.

Application filed July 27, 1923. Serial No. 654,251.

*To all whom it may concern:*

Be it known that I, ZALMANN CIFFRINOWITSCH, a citizen of Russia, residing at Berlin, Germany, have invented certain new and useful Improvements in Reversible Integrating Instruments, of which the following is a specification.

My invention relates to integrating electrical type instruments, such, for example, as integrating type induction meters and relays and more in particular to a compensating device to enable such instruments to function accurately for either direction of rotation.

It is well known that an integrating induction watthour meter, for example, is provided with means for producing a small constant torque to compensate for friction losses. One manner of producing this so-called light load adjustment in the induction meter is to provide a plate of conducting material which is fixed in such a position in the air gap of the meter that it produces a constant torque in one direction of rotation of the meter, namely, the normal direction of rotation. Such a meter registers correctly only in the normal direction so that it was hitherto necessary to employ two separate meters in order to measure the flow of power in different directions. If such a meter is correctly adjusted for one direction of rotation, it will register too little if operated in the reverse direction, since then the compensating light road torque acts against the meter torque and produces an error equal to double the frequency component. This error may be as high as 15 to 20 per cent at one-tenth load. This error is not confined to induction watthour meters, but is present in various types of integrating meters if the direction of rotation be reversed; for example, the wattless consumption meter, since in this type of meter the direction of rotation reverses when the electrical load changes from a capacity load to an inductive load.

The object of the present invention is to provide an arrangement dependent, for example, on the direction of rotation of the meter or the direction of flow of the commodity which is being measured to compensate for or eliminate the error which would otherwise be produced by the light load adjustment when the direction of rotation of the meter is reversed.

The features of my invention which I believe to be novel and patentable will be pointed out in the claims appended hereto. The application of my invention to a polyphase watthour meter of the induction type will be explained in connection with the accompanying drawing, whch illustrates one modification of my invention applied to a three phase induction watthour meter.

Referring to the drawing, I have represented at 10 and 11, the two meter elements of a three phase induction watthour meter connected to measure the power flowing in a line 12, which line may be considered to be a connecting tie between two alternating current systems. Let us assume that power may flow in either direction and that it is desired to measure the difference in power flow over a given period. For this purpose, the meter register (not shown) may run forward part of the time and backward part of the time, or two registers may be provided with ratchet devices so that one registers for one direction of rotation, and the other for the opposite direction of rotation. The registering mechanism constitutes no part of my invention and is referred to merely to make the description comprehensive. The meter elements 10 and 11 are of the well known induction type and drive a common shaft 13 which is to be connected with the registering mechanism in any well known manner. The shaft 13 is provided in this instance with a worm 14, which rotates a gear wheel 15 in the direction of the arrow thereon when the meter is rotating in its forward or normal direction. Under these conditions, the meter will be correctly compensated for friction losses in any well known manner, for example by means of a properly adjusted compensating plate indicated at 21. The wheel 15 is provided with an integral wheel 16 of smaller diameter against the circumference of which bears a light spring 17 provided with an electric contact on its underside, which cooperates with a stationary contact 18. The spring 17 is secured at 19 and is positioned in such a manner that when the direction of rotation of the meter is normal the contacts just mentioned are open. When the direction of rotation of the meter is backwards, spring 17 will be biased into the position shown in dotted lines and the contacts will be closed. These contacts control the current of an auxiliary torque producing element 20 which is designed to produce a torque in the backward direction of the meter equal to twice the torque produced by the light load compensating device 21 so that for the normal direction of rotation the meter friction losses will be compensated for by the usual means, and for the abnormal direction of rotation the meter friction losses will be compensated for by element 20, less the torque produced by the device 21. Since element 20 produces twice the torque of element 21, and they are in opposite directions, the meter will be accurate for the abnormal direction also. As shown, the element 20 is energized from the potential terminals of the meter and will thus be constant under ordinary conditions.

While I have illustrated my invention as applied to a watthour meter and operating in a specific manner, I do not wish to be limited to these modifications but seek to cover in the appended claims all applications and modifications coming fairly within the true spirit and scope of my invention.

What I claim as new and desire to secure by Letters Patent of the United States, is:—

1. An integrating type electrical measuring instrument adapted to be rotated in different directions of rotation under different metering conditions, auxiliary torque producing means for overcoming friction losses for both directions of rotation, and means dependent upon the direction of rotation of said instrument for controlling said auxiliary torque producing means.

2. An electrical measuring instrument of the integrating type provided with an auxiliary torque producing means to compensate for friction losses, characterized by the provision of a second auxiliary torque producing means of substantially twice the strength of said first mentioned means for producing a torque in the opposite direction to said first mentioned torque and means dependent upon the direction of flow of the commodity being measured by said instrument for energizing said second mentioned torque producing means.

3. An electrical measuring instrument of the integrating type provided with an auxiliary torque producing means to compensate for friction losses, characterized by the provisions of a second auxiliary torque producing means of substantially twice the strength of said first mentioned means for producing a torque in the opposite direction to said first mentioned torque, and means dependent upon the direction of rotation of said instrument for energizing said second mentioned torque producing means.

4. In an electrical measuring instrument of the integrating type, means for producing a substantially constant torque and means dependent upon the direction of rotation of said instrument for energizing said torque producing means.

5. In an electrical measuring instrument of the integrating type, means adapted to be energized from a constant potential source for producing an instrument compensating torque, contacts controlling the energizing circuit of said means, and means dependent upon the direction of rotation of the instrument for maintaining said contacts closed for one direction of rotation and open for the opposite direction of rotation of the instrument.

In witness whereof, I have hereunto set my hand this 26th day of June, 1923.

ZALMANN CIFFRINOWITSCH.